United States Patent [19]
Yamagis et al.

[11] 4,226,825
[45] Oct. 7, 1980

[54] FILM EMBOSSING PROCESS

[75] Inventors: Kikuo Yamagis; Hiroshi Okuyama; Hideo Kawaguchi, all of Minami-ashigara, Japan

[73] Assignee: Fuji Photo Film Co., Ltd., Minami-ashigara, Japan

[21] Appl. No.: 972,174

[22] Filed: Dec. 21, 1978

[30] Foreign Application Priority Data

Dec. 26, 1977 [JP] Japan .............................. 52/156907

[51] Int. Cl.² ...................... B29C 17/00; B29C 25/00
[52] U.S. Cl. .................................. 264/235; 264/284
[58] Field of Search ............... 264/284, 293, 230, 235, 264/346, 286

[56] References Cited

U.S. PATENT DOCUMENTS

| | | | |
|---|---|---|---|
| 2,177,661 | 10/1939 | Kimble | 264/235 |
| 3,261,903 | 7/1966 | Carr | 264/235 |
| 3,502,765 | 3/1970 | Spencer | 264/284 |
| 3,595,836 | 7/1971 | Korneli | 264/235 |

FOREIGN PATENT DOCUMENTS

2455882  8/1976  Fed. Rep. of Germany ........... 264/284

*Primary Examiner*—James B. Lowe
*Attorney, Agent, or Firm*—Sughrue, Rothwell, Mion, Zinn and Macpeak

[57] ABSTRACT

A film embossing process of roughening a lateral edge of a thermo-plastic film by mechanically deforming said lateral edge. The lateral edge is subjected to the film embossing process at a temperature of from the glass transition temperature (Tg) of the film to the temperature of (tg+60° C.). Subsequently the film is subjected to heat treatment at a temperature higher than the temperature of said film embossing process by at least 10° C. to 30° C.

4 Claims, 1 Drawing Figure

FILM EMBOSSING PROCESS

BACKGROUND OF THE INVENTION

This invention relates to a film embossing process of roughening a lateral edge of a thermo-plastic sheet material (hereinafter referred to as "a film" when applicable), so that the film can be readily handling during the manufacture.

In manufacturing films, embossing a lateral edge of the film, or a physical deformation is carried out in a step of the manufacture of films. This tends to improve the roll winding characteristic when the film is wound. It also facilitates the handling of the film when it is thereafter subjected to various processes.

This process is called "a film embossing process". In this process, a film is inserted between two rollers with small teeth, and the rollers abut through the film against each other, to thereby roughen a portion of the film. This process has merit that if the film embossing process is carried out with the film heated, the variation with time of the roughened portion of the film is relatively small.

When the film, having a lateral edge is roughened as described above, and wound in the form of a roll, the roughened lateral edge near the center of the roll is subjected to great pressure. This is especially true in the case where the film thus wound is stored for a long period of time after the manufacture. In such a condition a greater pressure will be applied to the roughened lateral edge near the center of the film roll. As a result, the thickness of the roughened portion of the film is decreased with time, and accordingly the object of roughening the lateral edge of the film cannot be achieved.

Furthermore, in roughening the lateral edge of a film this film embossing process, "wavy pleats" are created in the lateral edge of the film depending on a pressure applied thereto. As a result the effect of the film embossing process, which could otherwise be expected in handling the film, is often decreased. In a hot process where a film or an extruded material is heated, "wavy pleats" are significantly created.

In order to eliminate the creation of the "wavy pleats", a method has been proposed by Japanese Patent Application Publication No. 16064/1972, in which a film is locally heated to form a contracted portion immediately before the film is subjected to a film embossing process. This tends to cancel the elongation which is caused in the film embossing process. However, this method suffers in practice from difficulties because it is necessary to provide a technique for locally heating the film. Moreover, it is difficult to locally heat the film and is necessary to control the amount of contraction according to the variation of a force applied in the film embossing process. In order to exactly cancel the elongation caused during the film embossing process, and it is also necessary to change the heating temperature whenever the films to be processed are changed, because the degree of contraction depends on the kinds of film.

SUMMARY OF THE INVENTION

Accordingly, an object of this invention is to provide a film embossing process in which all of the above-described difficulties accompanying a conventional film embossing process have been eliminated.

It is another object of the invention to define a process whereby the variation with time of the roughened portion of a film is reduced, and no "wavy pleats" are created.

The objects of the invention can be achieved by carrying out a film embossing process at a temperature of from the glass transition temperature Tg of a film to be processed to the temperature of Tg+60° C., and subsequently by subjecting the film to heat treatment at a temperature 10° to 30° C. higher than the temperature of the film embossing treatment.

BRIEF DESCRIPTION OF THE DRAWING

The sole FIGURE in this case is a graph showing the variation with time of films subjected to the film embossing process. More particularly it is a graph of the residual ratio of the thickness of a roughened portion plotted against ageing.

DESCRIPTION OF THE PREFERRED EMBODIMENT

Figure 1:
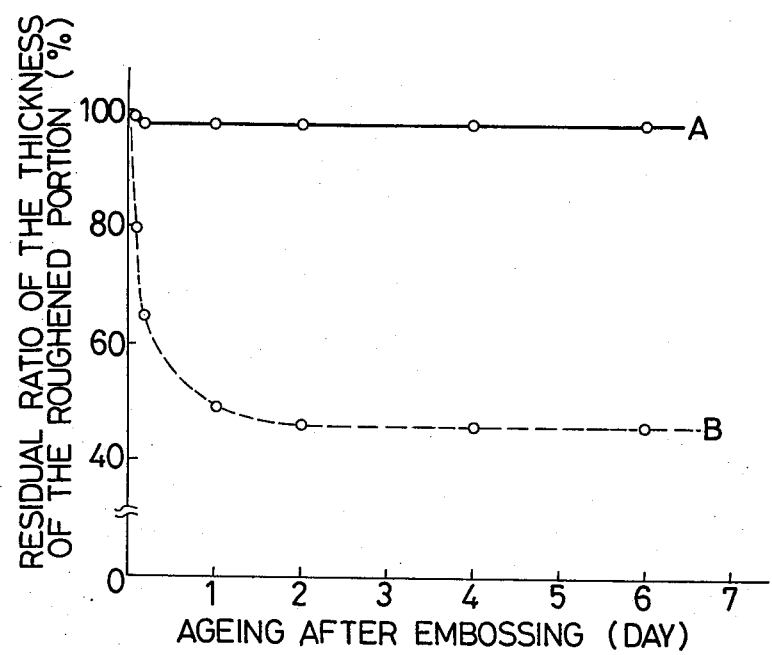

In a conventional cold roughening process, the deformation of roughening a film includes elastic deformation. Accordingly, with the lapse of time the roughness is gradually reduced, that is, the thickness of the roughened portion of the film is gradually reduced. On the other hand, in the hot roughening process of this invention carried out in a temperature range of from Tg to Tg+60° C., a film is roughened by plastic deformation, and therefore its elapsed time variation is reduced. If the temperature is higher than the Tg+60° C., in general, plastic flow results with a film although it depends on the kinds of film. Accordingly, it is sometimes difficult to sufficiently increase the thickness of the film by roughening it.

It has been found that the "wavy pleats", which are formed in the lateral edge of a film in the conventional embossing process, are eliminated by subjecting it to heat treatment at a temperature 10°-30° C. higher than the temperature at which the embossing processes are carried out.

It has been found that it is essential that the temperature of this after-heat-treatment be higher than the temperature of the film embossing process in order to eliminate the "wavy pleats". But, if it is excessively higher, then the desired thickness of the roughened portion of the film is decreased. That is, the temperature of the after-heat-treatment should be higher by 10°-30° C. The time required for this after-heat-treatment depends on the temperature utilized. However, in general, the higher the temperature of the after-heat-treatment, the shorter the time required for the after-heat-treatment and it is preferable that the time of the after-heat-treatment is approximately 30 to 600 seconds. However, it should be noted that it is not preferable to perform the heat treatment for a long period of film at a high temperature, because the heat treatment will decrease the thickness of the roughened portion of the film.

Thermo-plastic films utilizing this invention may be any film having a glass transition temperature higher than room temperature, or 30° C., preferably 50° C. Such thermo-plastic films are, for instance, films made of polystyrene, polycarbonate, polyethylene-terephthalate, cellulose acetate, cellulose acetate butylate, and nylon. These films may be subjected to surface treatment or surface coating to the extent that the glass transition temperature Tg thereof is not affected.

The thickness of a film, which is to be embossed by the film embossing process according to the invention, is not strictly limited. However, it is preferable that the thickness of the film is in the range from 30μ to 200μ.

The resultant thickness of the portion of a film, which is embossed by the film embossing process, depends on the kind and handling characteristic thereof. However, it is desirable that the increased thickness is in the range of 10–60% of the thickness of the film.

As described above, in the film embossing process according to this invention, after the film embossing process is carried out at a temperature of from the glass transition temperature Tg of the film to the temperature of Tg+60° C., the film is subjected to heat treatment at a temperature 10°–30° C. higher than that of the film embossing process. Hence the elapsed time variation of the roughened portion of the film is reduced and "wavy pleats" are not created. Thus, the film winding characteristic and the film handling characteristic can be remarkably improved.

In order to demonstrate the effects of this invention, an example and comparison examples will be described below:

EXAMPLE

Under the following conditions, the lateral edge of a film was subjected to film embossing process:

(1) Film

Polyethylene-terephthalate film oriented biaxially (the thickness being 100μ, the glass transition temperature being 78° C.)

(2) Conditions in the Film Embossing Process A temperature of 100° C., and a pressure of 1.5 Kg/cm$^2$.

(3) Conditions in the After-Heat-Treatment For 120 seconds at a temperature of 130° C.

(4) Results

The variation with time of the thickness of the roughened lateral edge of the film, as indicated by the curve A in FIG. 1 was substantially negligible. No "wavy pleats" were created.

COMPARISON EXAMPLE 1

The same film embossing process as the above-described Example was carried out, but the after-heat-treatment was not performed.

(1) Results

The variation with time of the thickness of the roughened lateral edge of the film was substantially negligible, similarly as in the Example, but the "wavy pleats" were significantly created. Thus, the film could not put in to practical use.

COMPARISON EXAMPLE 2

The film embossing process was carried out under the same conditions as the Example except that the temperature of the film embossing process was changed to 30° C.

(1) Results

The variation with time of the roughened lateral edge of the film was finally reduced to 50% of its initial value, as indicated by the curve B in FIG. 1. However, the degree of creation of the "wavy pleats" was relatively small.

We claim:

1. A film embossing process for roughening a lateral edge of a thermo-plastic film by mechanical deformation, to produce embossed film, comprising the steps of; subjecting the lateral edge of said thermo-plastic film to an embossing process at a temperature in the range of Tg to Tg+60° C., where Tg is the glass transition temperature to produce an intermediate film and, heat treating said intermediate film for a period of time in the range of from 30 to 600 seconds at a temperature exceeding the temperature of the film embossing step by approximately 10° C. to 30° C., wherein said process alleviates wavey pleating in said embossed film.

2. The method of claim 1 wherein the original thickness of the film is in the range of 30μ to 200μ.

3. The method of claims 1, or 2 wherein the step of embossing said film increasing the thickness of said lateral edge by 10 to 60% of the original thickness of said film.

4. The method of claims 1, or 2 wherein said film is selected from the group consisting of polystyrene, polycarbonate, polyethylene-terephthalate, cellulose acetate, cellulose acetate butylate and nylon.

* * * * *